US007749064B2

(12) United States Patent
Marks et al.

(10) Patent No.: US 7,749,064 B2
(45) Date of Patent: Jul. 6, 2010

(54) METHOD OF PLAYING A SLOT MACHINE GAME IN WHICH THE AWARD VALUE FOR A WINNING SYMBOL COMBINATION IS BASED UPON SYMBOLS NOT INCLUDED IN THE WINNING SYMBOL COMBINATION

(75) Inventors: Daniel Mordecai Marks, Cold Spring, NY (US); Joseph Dominic Masci, Montrose, NY (US); Anthony Mark Singer, Ramsey, NJ (US)

(73) Assignee: PTT, LLC, Mahwah, NJ (US)

( * ) Notice: Subject to any disclaimer, the term of this patent is extended or adjusted under 35 U.S.C. 154(b) by 357 days.

(21) Appl. No.: 11/509,170

(22) Filed: Aug. 23, 2006

(65) Prior Publication Data

US 2007/0060265 A1 Mar. 15, 2007

Related U.S. Application Data

(60) Provisional application No. 60/710,596, filed on Aug. 23, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/16; 463/20; 463/25

(58) Field of Classification Search .................. 463/16, 463/20, 25
See application file for complete search history.

(56) References Cited

U.S. PATENT DOCUMENTS

| | | | | |
|---|---|---|---|---|
| 5,411,271 | A * | 5/1995 | Mirando | 463/9 |
| 6,609,971 | B2 * | 8/2003 | Vancura | 463/16 |
| 6,634,943 | B1 * | 10/2003 | Baerlocher | 463/25 |
| 2005/0054422 | A1 * | 3/2005 | Rothkranz et al. | 463/20 |

* cited by examiner

*Primary Examiner*—Dmitry Suhol
*Assistant Examiner*—Wei Li

(57) ABSTRACT

The present invention includes a variety of methods to calculate awards for a winning symbol combinations based upon the values assigned to some or all of the symbols or symbol positions not included in the winning symbol combinations.

2 Claims, 7 Drawing Sheets

METHOD OF PLAYING A SLOT MACHINE GAME IN WHICH THE AWARD VALUE FOR A WINNING SYMBOL COMBINATION IS BASED UPON SYMBOLS NOT INCLUDED IN THE WINNING SYMBOL COMBINATION

PRIORITY CLAIM

This application is a non-provisional patent application that claims priority to and the benefit of U.S. Provisional Patent Application Ser. No. 60/710,596, filed Aug. 23, 2006, incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF THE INVENTION

In general, the present invention relates to methods of calculating award values for winning symbol combinations in a slot machine game. More specifically, the present invention calculates awards for a winning symbol combination based upon the values assigned to some or all of the symbols or symbol positions not included in the winning symbol combinations.

BACKGROUND OF THE INVENTION

To play a conventional slot machine, the player deposits money into the machine, sets the wager, spins the reels, and collects awards for winning symbol combinations appearing on selected pay lines, according to a pay schedule. Since conventional slot machines are limited to the foregoing methods, players, casinos, and manufacturers suffer.

While the appearance of conventional slot machines may change from one theme, such as space aliens, to another, such as farm animals, the underlying methods of play—setting the wagering, spinning the reels, and calculating awards—remain the same from machine to machine.

The use of fixed pay schedule to calculate awards is one example of the similar methods used by conventional slot machines. A conventional award is determined according to a fixed award schedule, with an award value listed on the schedule for each winning symbol combination.

The similarities of conventional games, such as award values based upon award schedules, frustrates players, casinos, and manufacturers. Players tire of games using the same methods of play; casinos cannot distinguish their games offerings from other casinos; and manufacturers cannot distinguish their products from other manufacturers.

New methods of playing slot machines, therefore, are required to provide players, casinos, and manufacturers with unique slot machine games, such as the present invention's new ways to calculate award values for winning symbol combinations.

SUMMARY OF THE INVENTION

The present invention includes a variety of methods to calculate the award for a winning symbol combination using the values assigned to one or more symbols or symbol positions not included in the winning symbol combination.

X-Ray Values. A first preferred embodiment of the present invention ("X-Ray Values") calculates the award for a scatter symbol combination by "x-raying" the values associated with each of the symbol positions not included in the scatter symbol combination.

In the X-Ray Values embodiment, credit values are assigned to each symbol position in the matrix, without regard to the symbols appearing in the symbol positions. The credit values assigned to each symbol position change from spin to spin depending on the number of paylines played and/or the amount wagered on each played payline.

Upon the appearance of two or more scatter symbols in the symbol matrix, the game reveals all of the values assigned to the symbol positions not showing scatter symbols. The value of scatter symbol combination is then calculated by adding the all of the revealed credit values.

Gift Symbols. A second preferred embodiment of the present invention ("Gift Symbols") calculates the award for a scatter symbol combination by "opening" the values associated with each symbol in the sub-set of "gift" symbols not included in the scatter symbol combination.

In the Gift Symbols embodiment, a sub-set of symbols are indicated with a "gift" icon on the symbol. For example, a cherry symbol may also include a "gift" icon in the lower right-hand corner.

Credit values are then assigned each symbol in the "gift" symbol sub-set, without regard to the symbol positions in which the symbols appear. The credit values assigned to each symbol in the "gift" sub-set change from spin to spin depending on the number of paylines played and/or the amount wagered on each played payline.

Upon the appearance of two or more scatter symbols in the symbol matrix, the game reveals all of the values assigned to the "gift" symbols appearing in the symbol matrix. The value of scatter symbol combination is then calculated by adding the all of the revealed credit values.

Book End Symbols. A third preferred embodiment, Book End Symbols, calculates the award for a scatter symbol combination by "booking" the credit values contained in the symbol positions between the scatter symbols on the one or more pay lines upon which the scatter symbols appear.

In the Book End Symbols embodiment, credit values are assigned to each symbol position in the matrix, without regard to the symbols appearing in the symbol positions. The credit values assigned to each symbol position change from spin to spin depending on the number of paylines played and/or the amount wagered on each played payline.

Upon the appearance of two or more scatter symbols on a played payline, the game reveals all of the values assigned to the symbol positions between the scatter symbols on each played payline upon which the scatter symbols appear. Symbol positions on a pay line outside the Book End symbols do not reveal any values. The value of scatter symbol combination is then calculated by adding the all of revealed credit values.

BRIEF DESCRIPTION OF THE DRAWINGS

The accompanying figures illustrate various stages of the preferred embodiment of the present invention.

DESCRIPTION OF A PREFERRED EMBODIMENT

Figure 1:
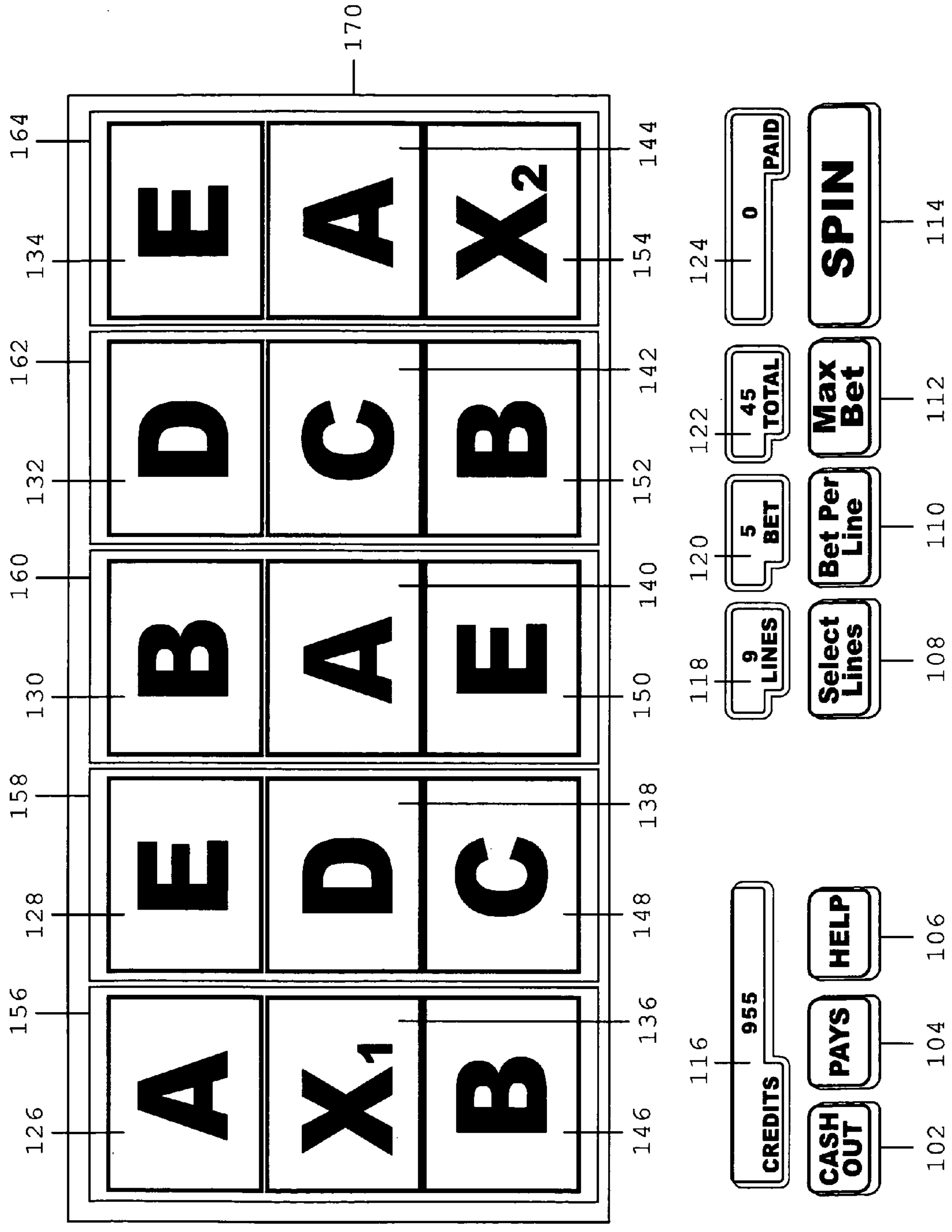
FIG. 1 shows a game screen with two scatter symbols.

To play the preferred embodiments of the present invention, the player initializes credits, sets the wager, spins the reels, and collects awards for wining symbol combinations including scatter symbol awards calculated using the values assigned to some or all of the symbols or symbol positions not included in the scatter symbol combination, as detailed below with reference to FIGS. 1 to 6:

Initialize Credits. In FIG. 1, the player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, smart cards, or other electronic funds transfers.

Set the Wager. In FIG. 1, the player sets the wager by selecting pay lines and setting the bet per pay line. The wager is calculated by multiplying the number of selected pay lines by the bet per pay line. For example, the player may wager five credits on each of nine pay lines for a total bet of forty-five credits. The total bet amount is displayed on the Total Bet meter 122.

To select pay lines, the player uses the Select Pay Lines button 108 and views the number of selected pay lines on the Select Pay Lines meter 118. Pay lines are selected in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, up to five credits may be wagered on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any wager may be assigned a button.

Spin the Reels. In FIG. 1, the player uses the Spin button 114 to randomly rearrange the symbols displayed in the symbol matrix 170. The symbol matrix 170 contains three symbol positions for each of the five slot reels 156-164 for a total of fifteen symbol positions 126-154. Alternatively, any number of reels with any number of symbol positions may be used.

The slot reels 156-164 spin and randomly stop one reel at-a-time, from left to right, until all five reels have stopped and all fifteen symbol positions 126-154 of the symbol matrix 170 are revealed. Alternatively, any size symbol matrix may be used and any method may be used to rearrange symbols in the symbol matrix.

Line Pay Awards. The player receives line pay awards for winning symbol combinations formed by two or more, same, adjacent symbols, starting from the leftmost position of a pay line. A predetermined pay schedule lists the award for each winning symbol combination. Any number of winning symbol combination may be defined, with any amount assigned to each award. For example, the pay schedule may define four "8" symbols as a winning symbol combination with an award of 10X the bet per line. The player may view the pay schedule by using the Pays button 104.

Scatter Awards. FIGS. 1 to 7 illustrate three preferred methods to calculate the value of the scatter symbol combinations using the values assigned to some or all of the symbols or symbol positions not included in the scatter symbol combination: X-Ray Values, Gift Symbols, and Book End Symbols.

Figure 2:
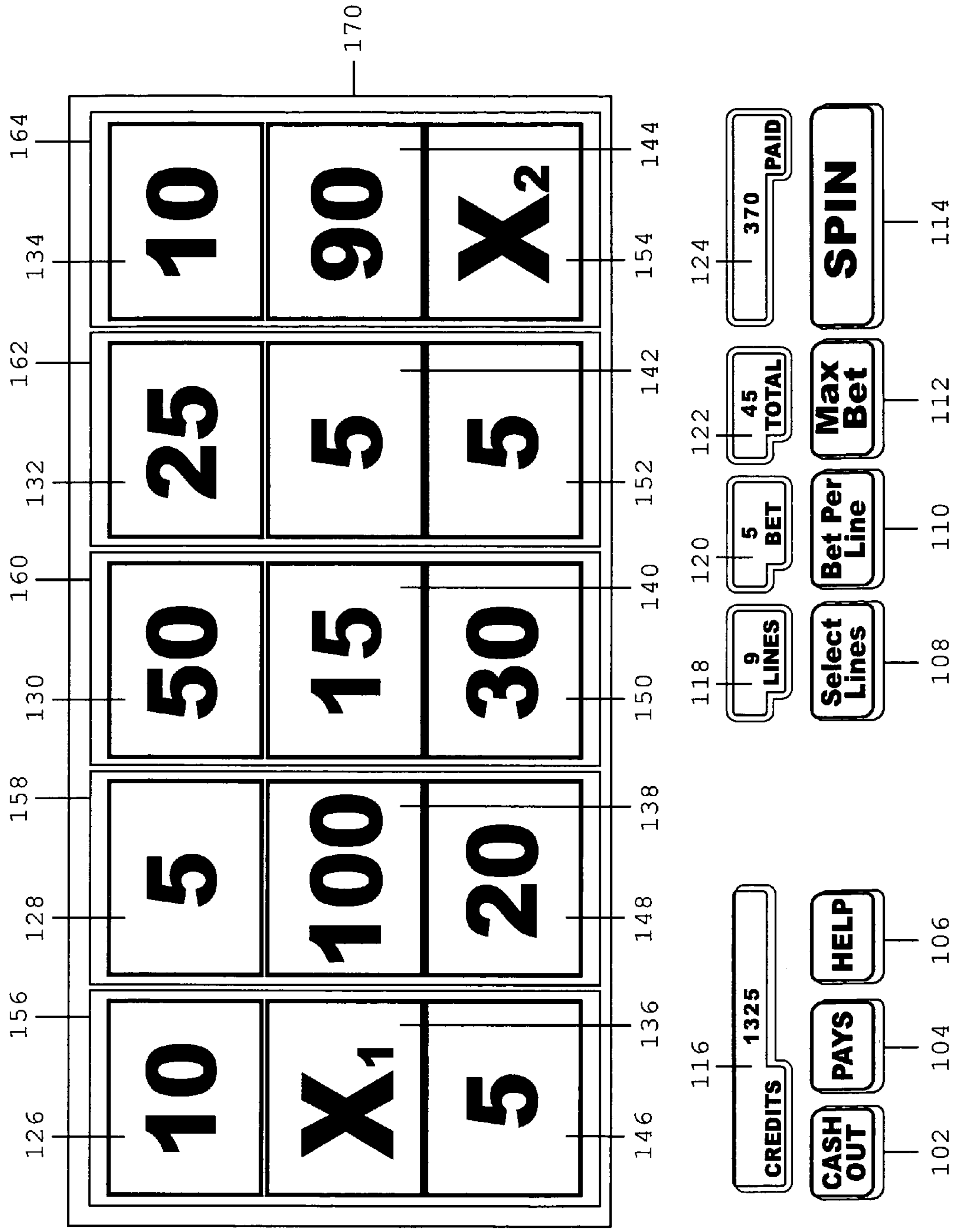
FIG. 2 shows a game screen with the values of all non-scatter symbols.

FIGS. 1 and 2 show the X-Ray Values embodiment operating in a symbol matrix 170 with 15 symbol positions 126-154. For every spin the game assigns a random credit amount to each symbol position 126-154 in the symbol matrix 170, with each amount falling within a predetermined range of values between 1 and 10 times the total wager. None of the values assigned to the symbol positions 126-154 are displayed to the player.

FIG. 1 shows two scatter symbols (X) 136, 154 in the symbol matrix 170. The first X symbol (X1) 136 appears in the left-most column 156 and the second X symbol (X2) 154 appears in the right-most column 164. The appearance of two X symbols 136, 154 in the symbol matrix 170 causes the game to reveal the credit values assigned to each non-X symbol position 126-134, 138-152.

FIG. 2 shows all of the credit values assigned to the non-X symbol positions 126-134, 138-152. The value of the X1 and X2 scatter symbol combination is calculated by adding the all of the revealed, or "x-rayed", credit values: 10+5+50+25+10+100+15+5+90+5+20+30+5=370 credits. The game then issues the 370 credit award to the player, as shown on the Paid meter 124, and adds the award to the player's credit pool, as shown on the Credits meter 116.

Figure 3:
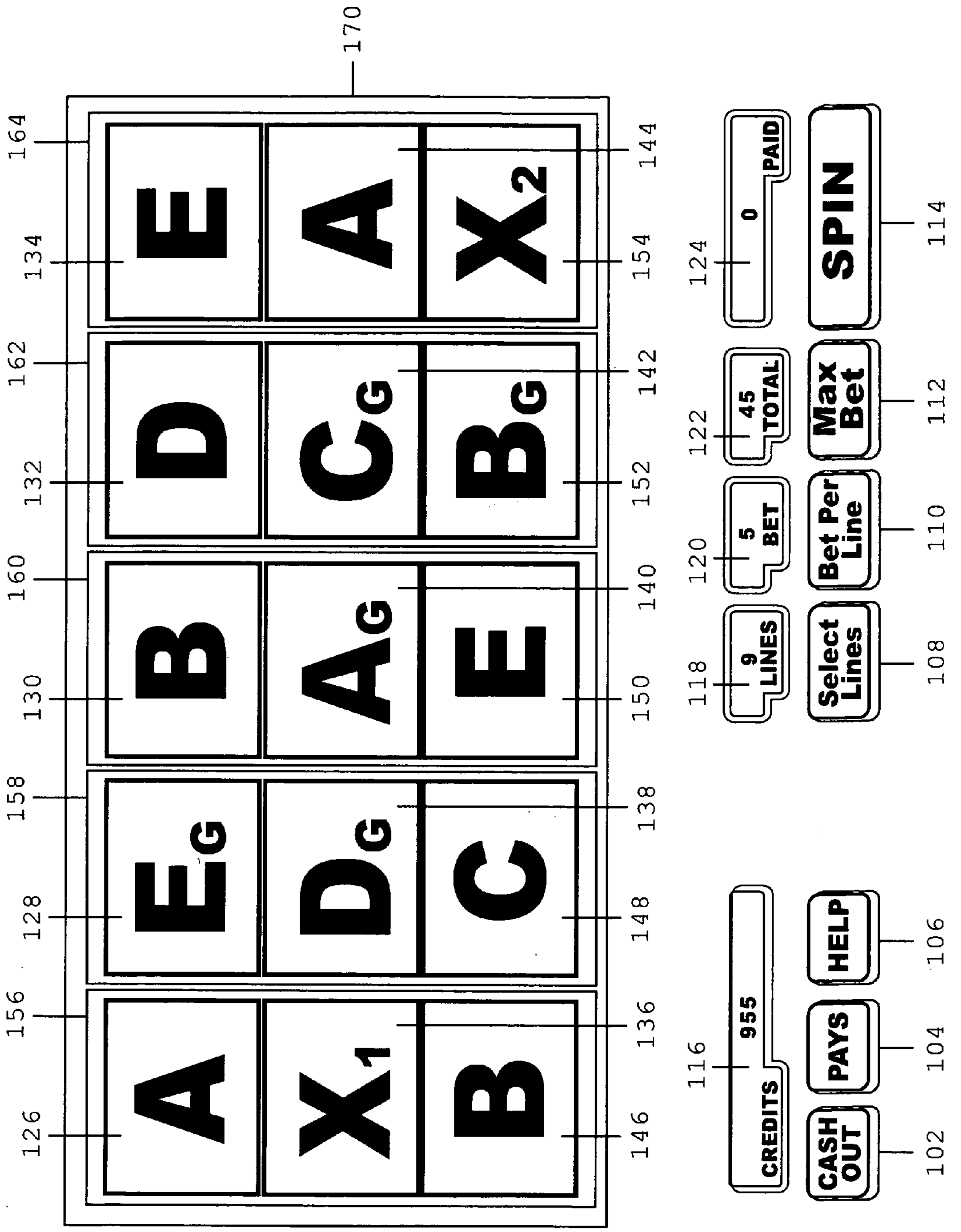
FIG. 3 shows a game screen with two scatter symbols and four "gift" symbols
Figure 4:
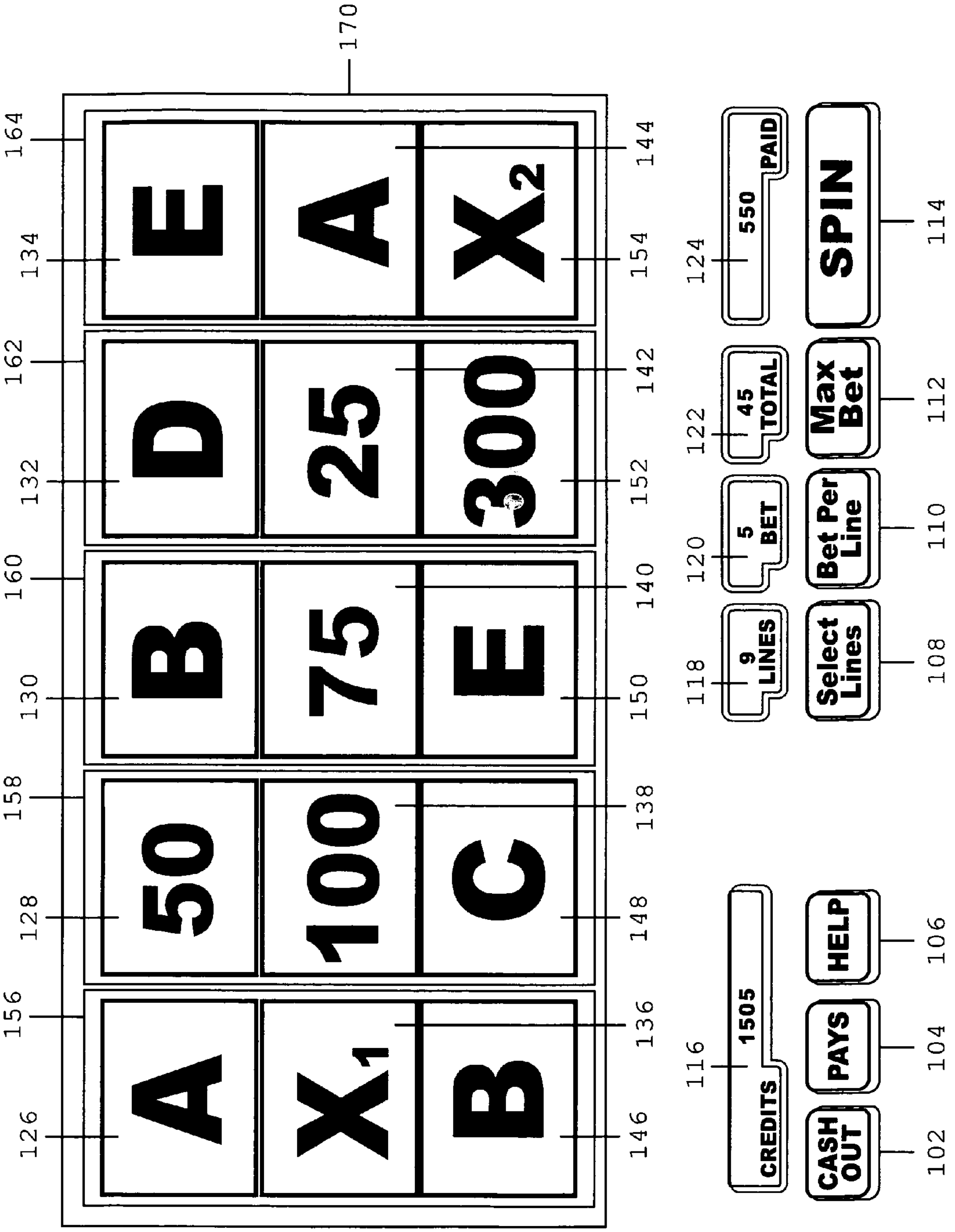
FIG. 4 shows a game screen with the values of all four "gift" symbols.

FIGS. 3 and 4 show the Gift Symbols embodiment using a symbol set that includes a sub-set of symbols indicated by a gift icon ("Gift Symbols" or [Symbol]g) in the lower right-hand corner of the symbol. Symbols with gift icons (i.e. Ag) form line pay combinations in the same manner as the same symbol without a gift icon (i.e. A). Only symbols with gift icons (i.e. Ag), however, determine the scatter symbol award values.

For every spin the game assigns a random credit amount to each symbol in the Gift symbol sub-set, with each amount falling within a predetermined range of values between 1 and 10 times the total wager. None of the values assigned to the symbols in the Gift sub-set are displayed to the player.

FIG. 3 shows two scatter symbols (X) 136, 154 and in the symbol matrix 170. The first X symbol (X1) 136 appears in the left-most column 156 and the second X symbol (X2) 154 appears in the right-most column 164. The appearance of two X symbols 136, 154 in the symbol matrix 170 causes the game to reveal the credit values assigned to each symbol in the Gift symbol sub-set 128, 138-142, and 152 appearing in the symbol matrix 170.

FIG. 4 shows the credit values assigned to the symbols in the Gift symbol sub-set 128, 138-142, and 152. The value of the X1 and X2 scatter symbol combination is calculated by adding the all of the revealed, or "gifted", credit values:

50+100+75+25+300=550 credits. The game then issues the 550 credit award to the player, as shown on the Paid meter 124, and adds the award to the player's credit pool, as shown on the Credits meter 116.

Figure 5:
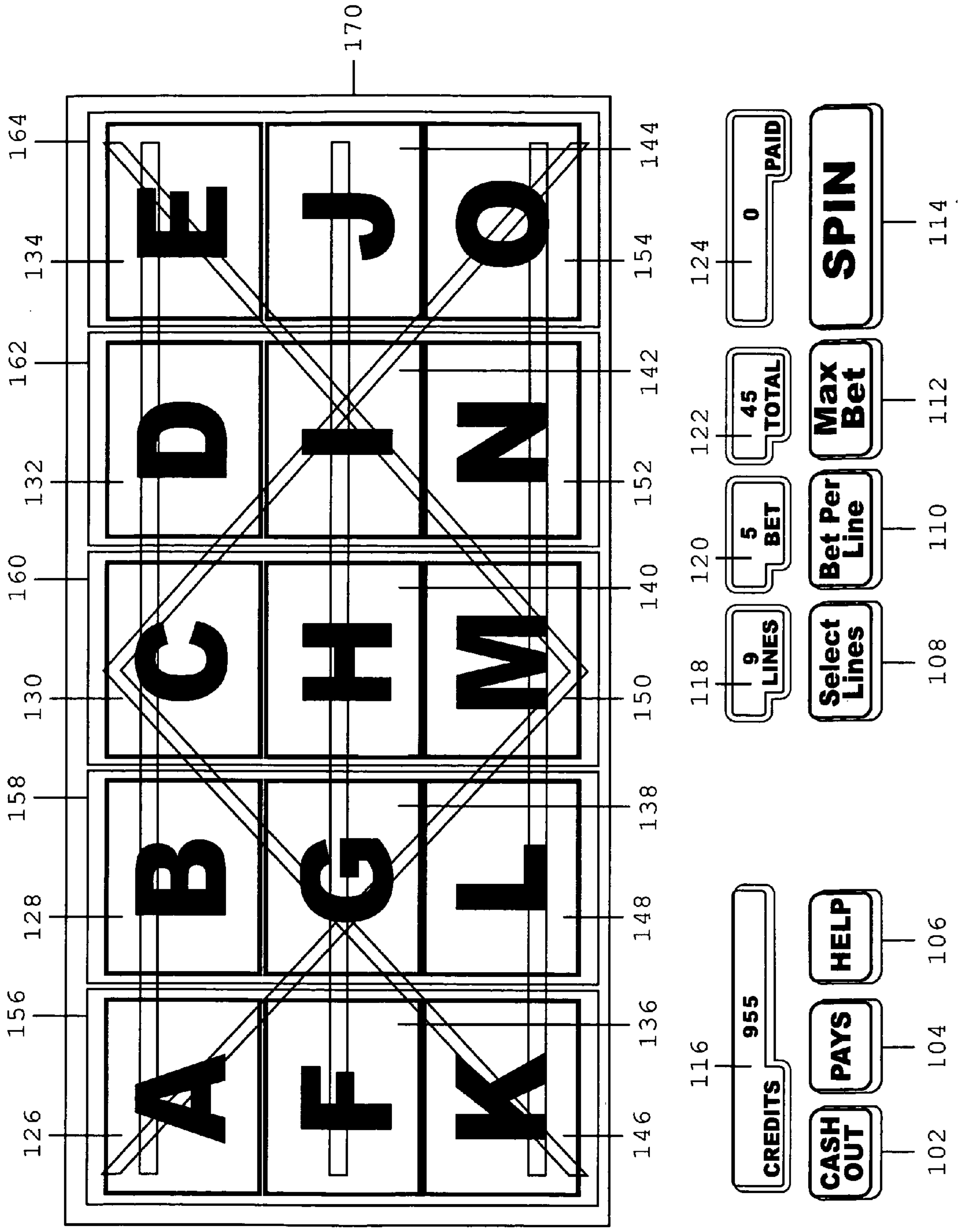
FIG. 5 illustrates the paths of five defined paylines across the symbol matrix.
Figure 6:
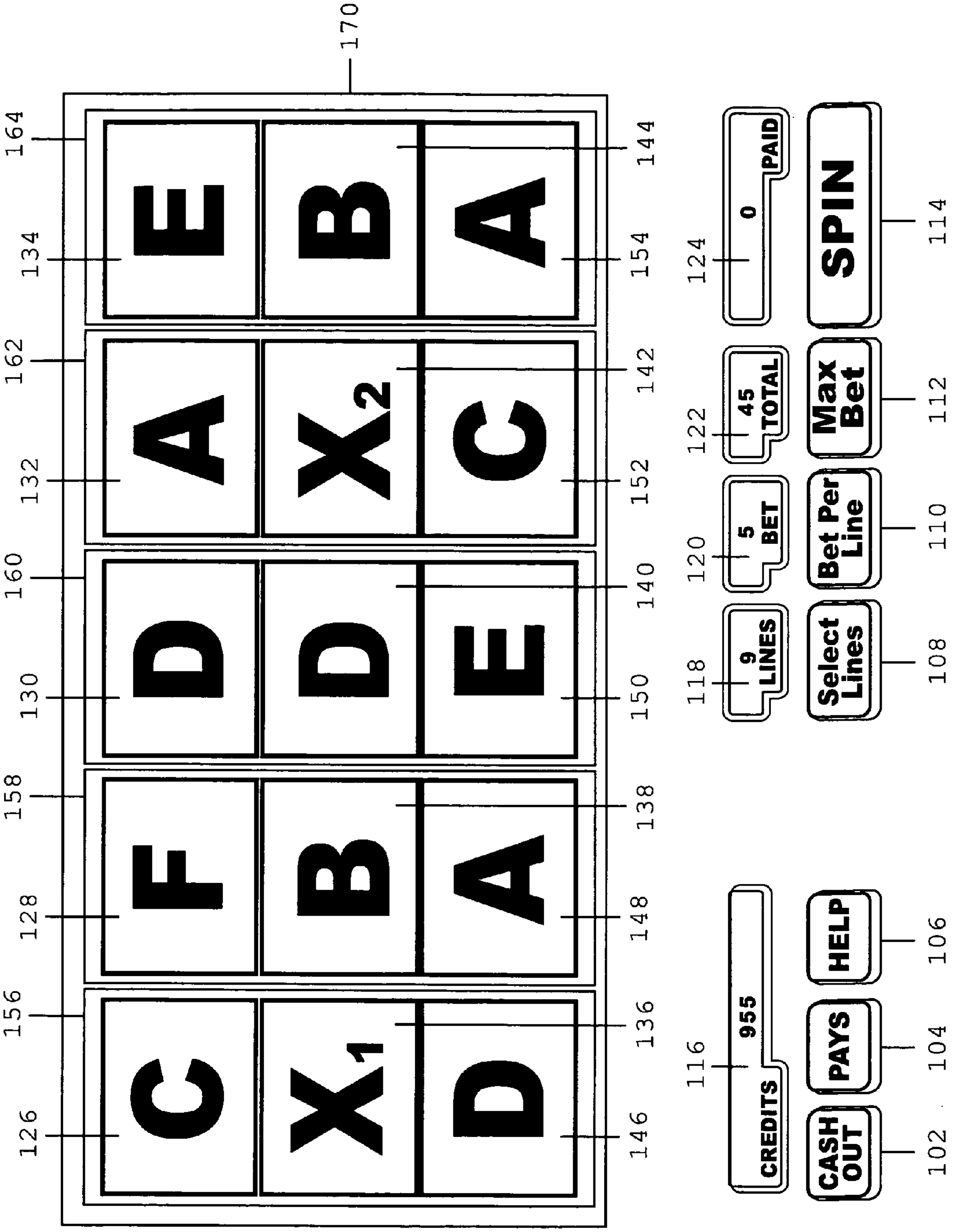
FIG. 6 shows a game screen with two scatter symbols.
Figure 7:
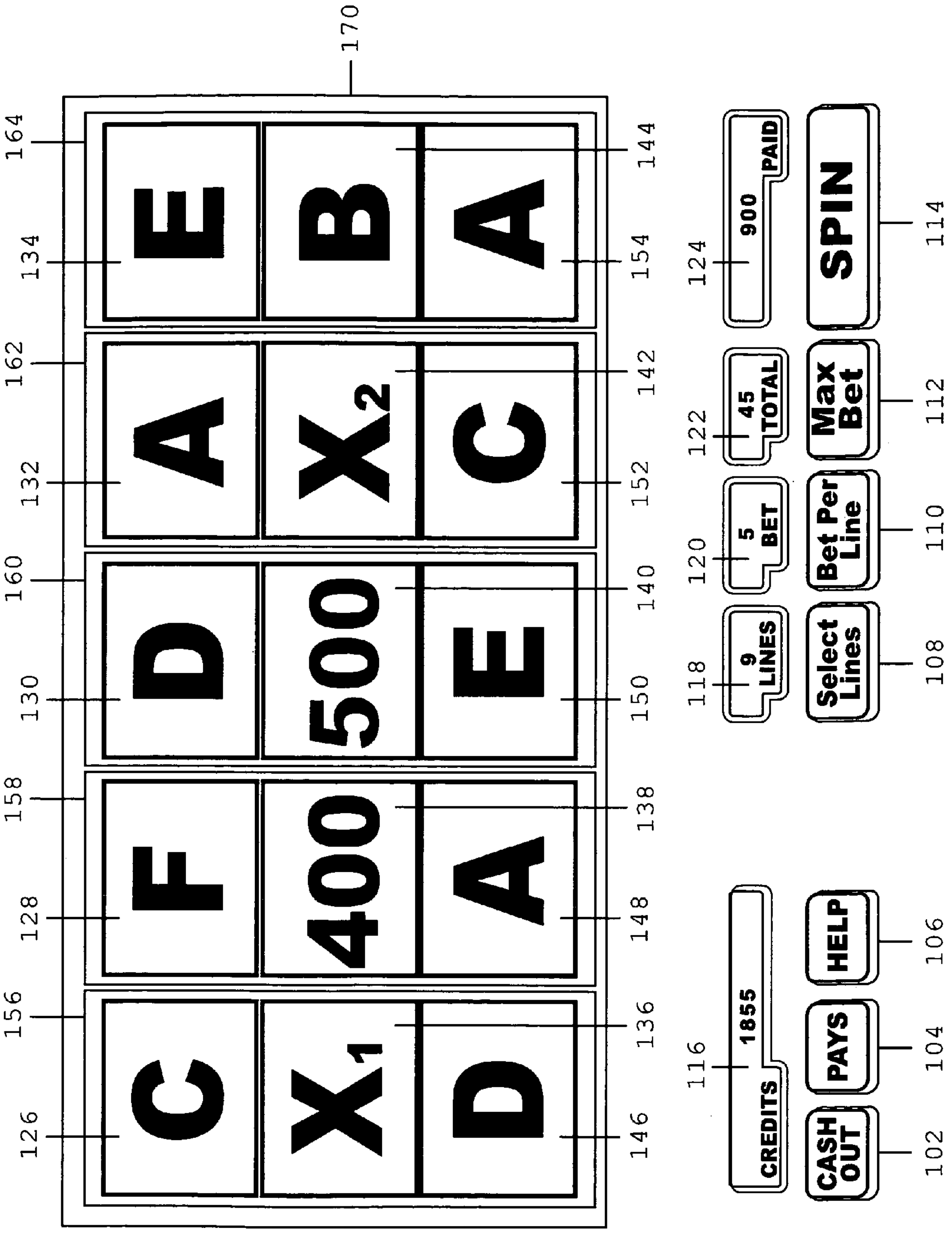
FIG. 7 shows a game screen with the values of the symbols between the scatter symbols on the pay line upon which the scatter symbols appear.

FIGS. 5, 6, and 7 show the Book Ends embodiment operating in a symbol matrix 170 with 5 unique paylines defined across 15 symbol positions 126-154. For every spin the game assigns a random credit amount to each symbol position 126-154 in the symbol matrix 170, with each amount falling within a predetermined range of values between 1 and 10 times the total wager. None of the values assigned to the symbol positions 126-154 are displayed to the player.

FIG. 5 illustrates the five defined pay line paths as follows: pay line 1 uses symbol positions F, G, H, I, J; pay line 2 uses symbol positions A, B, C, D, E; pay line 3 uses symbol positions K, L, M, N, 0; Pay line 4 uses symbol positions A, G, M, I, E; and pay line 5 uses symbol positions K, G, C, I, O. Alternatively, any number of paylines, using any combination of symbol positions 126-154 may be defined across the symbol matrix 170.

FIG. 6 shows two scatter symbols (X) 136, 142 in the symbol matrix 170. The first X symbol (X1) 136 appears in the left-most column 156 and the second X symbol (X2) 142 appears in the fourth column from the left 162. The appearance of two X symbols 136, 142 in the symbol matrix 170 causes the game to reveal the credit values assigned to each symbol position 138-140 between the scatter symbols 136, 142 on pay line 1.

FIG. 7 shows the credit values assigned to the symbol positions 138-140 between the scatter symbols 136,142 on pay line 1. The value of the X1 and X2 scatter symbol combination is calculated by adding the all of the revealed, or "booked", credit values: 400+500=900 credits. The game then issues the 900 credit award to the player, as shown on the Paid meter 124, and adds the award to the player's credit pool, as shown on the Credits meter 116.

Following the issuance of awards, the player may continue to play the gaming machine or the player may collect the balance of credits by pressing the Cash Out button 102. In addition, the player may press the Help button 106 to view the rules of the game.

ALTERNATIVE EMBODIMENTS OF THE INVENTION

The preferred embodiments described above determine the value of a winning symbol combination using values assigned to symbols or symbol positions not included in the winning symbol combination. In addition to the methods used to operate these preferred embodiments, however, the present invention may be modified in one or more aspects including but not limited to the following alternative embodiments:

In another embodiment, the present invention may calculate the award for any combination of symbols. For example, the present invention may calculate the value of any winning symbol combination appearing on a payline, or anywhere else in the symbol matrix, using the values assigned to symbols or symbol positions not included in the winning symbol combination.

In another embodiment, the present invention may calculate the award for a winning symbol combination using the value displayed in any sub-set of symbols or symbol positions not included in the winning symbol combination. For example, the award for "A" symbol combinations may be calculated by only adding the values displayed in the second and fourth columns of the symbol matrix.

In another embodiment, the present invention may calculate the award for a winning symbol combination using any mathematical function upon the values displayed in symbols or symbol positions not included in the winning symbol combination. For example, awards for a winning symbol combination may be calculated by adding the values displayed on some symbols and then multiplying by the values displayed on other symbols.

In another embodiment, the present invention may assign fixed values to a symbol or symbol position. For example, symbol "A" is assigned 5 times line bet, symbol "B" is assigned 10 times number of lines selected, and symbol "C" is assigned 3 times the total bet.

In another embodiment, the present invention may assign random values to a symbol or symbol position. For example, symbol "A" is assigned a value between 1 and 1,000 credits, symbol "B" is assigned a value between 10 and 10,000 credits, and symbol "C" is assigned a value between 100 and 100,000 credits.

In another embodiment, the present invention may assign random values to a symbol or symbol position, such that the random value falls within a range of values based upon the line bet, number of lines selected, total wager placed on the game. For example, symbol "A" is assigned 3 to 25 times line bet, symbol "B" is assigned 2 to 10 times number of lines selected, and symbol "C" is assigned 1 to 3 times the total wager.

In another embodiment, the present invention may assign values to a symbol or symbol position based upon the amount of a separate wager placed upon the present invention. For example, symbol "A" is assigned 3 times the separate wager, symbol "B" is assigned 10 times the separate wager, and symbol "C" is assigned 2 to 15 times the separate wager.

In another embodiment, the present invention assigns fixed values to some symbols or symbol positions and variable values to other symbols or symbol positions. For example, values may be fixed on all symbol positions in the second and fourth columns, but vary from spin to spin on the first, third, and fifth columns of the symbol matrix.

In another embodiment, the present invention assigns values to symbols or symbol positions for predetermined number of spins. For example, new values may be generated and assigned to symbols every 5 spins.

In another embodiment, the present invention assigns values to symbols or symbol positions for random number of spins. For example, new values may be generated and assigned to symbols every 1 to 100 spins.

In another embodiment, the present invention assigns values to symbols or symbol positions upon the attainment of a predetermined event. For example, new values may be generated and assigned to symbols upon issuance of any award based upon the present invention.

In another embodiment, the present invention assigns bonus features to symbols or symbol positions. For example, symbol "A" is assigned 3 free spins, symbol "B" is assigned 5 free spins, and symbol "C" is assigned 10 free spins.

In another embodiment, the present invention assigns multiplier values to symbols or symbol positions. For example, symbol "A" is assigned a 3 times multiplier value, symbol "B" is assigned a 5 times multiplier value, and symbol "C" is assigned a 10 times multiplier value. The multiplier values are totaled and applied towards another amount, such as total wager. For example, a combined multiplier value of 20 is applied towards a total wager of 50 credits for a total award of 1000 credits.

In another embodiment, the present invention assigns prizes of any type to symbols or symbol positions. For example, symbol "A" is a free drink, symbol "B" is a free meal, and symbol "C" is assigned a new car.

In another embodiment, the present invention may be used as an optional game feature, such as a feature that is purchased with a supplemental wager by the player.

In another embodiment, the present invention may be used as a bonus game feature, such as a feature of a free-spin bonus game.

SCOPE OF THE INVENTION

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The patent application and claims, therefore, seek to cover all features and advantages that fall within the true spirit and scope of the present invention.

We claim:

1. A method of operating an electronic gaming device via a processor, comprising:

a) the processor operable to display a symbol matrix formed by at least one row intersecting with a plurality of columns, wherein said rows and said columns include a plurality of symbols and said plurality of symbols contains a sub-set of uniquely demarcated symbols;

b) the processor operable to randomly rearrange said plurality of symbols;

c) the processor operable to display said rearranged symbols; and d) the processor operable to calculate an award of a scatter symbol combination, as follows:

i. the processor operable to assign a credit value to each said demarcated symbol displayed in the symbol matrix;

ii. the processor operable to reveal the credit values of all said demarcated symbols simultaneously displayed with the scatter symbol combination wherein said value is not calculated based upon the scatter symbol combination; and iii. the processor summing the revealed credit values to determine the award for the scatter symbol combination.

2. A method of claim 1 in which the award for a scatter symbol combination is calculated as follows:

a) the processor operable to assign a credit value to each symbol associated with the uniquely demarcated subset of symbols appearing in the symbol matrix;

b) the processor operable to reveal said assigned credit values of all said demarcated symbols not included in the scatter symbol combination; and c) the processor operable to sum the revealed credit values to determine the award for the scatter symbol combination.

* * * * *